(12) United States Patent
Graham et al.

(10) Patent No.: US 12,379,485 B2
(45) Date of Patent: *Aug. 5, 2025

(54) SYSTEMS AND METHODS FOR HANDHELD SINGLE CHIP SUBMILLIMETER RADARS

(71) Applicant: Lassen Peak, Inc., North Bend, WA (US)

(72) Inventors: Hatch Graham, North Bend, WA (US); Ehsan Afshari, Ann Arbor, MI (US); Karl Triebes, Kirkland, WA (US); Ryan Kearny, Kirkland, WA (US)

(73) Assignee: Lassen peak, inc., North bend, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,042

(22) Filed: Jul. 31, 2024

(65) Prior Publication Data

US 2024/0418824 A1     Dec. 19, 2024

Related U.S. Application Data

(63) Continuation-in-part of application No. 17/243,563, filed on Apr. 28, 2021.

(Continued)

(51) Int. Cl.
*G01S 13/88* (2006.01)
*G01S 7/03* (2006.01)
(Continued)

(52) U.S. Cl.
CPC ............ *G01S 13/887* (2013.01); *G01S 7/032* (2013.01); *G01S 7/412* (2013.01); *G01S 13/426* (2013.01);
(Continued)

(58) Field of Classification Search
CPC ........ G01S 13/887; G01S 7/032; G01S 7/412; G01S 7/417; G01S 13/89; G01S 13/426; G01S 2013/0245; G01S 7/35
See application file for complete search history.

(56) References Cited

U.S. PATENT DOCUMENTS 9,316,732 B1    4/2016  Mohamadi
10,812,125 B1 * 10/2020 Badic ................. H04W 72/542
(Continued)

FOREIGN PATENT DOCUMENTS

WO   WO 2007086916 A2    2/2007
WO   WO 2009067627 A1    5/2009
(Continued)

OTHER PUBLICATIONS

Photonics Media. "324-GHz Waves Reported" Jul. 2007. Accessed Mar. 17, 2025 <https://web.archive.org/web/20201022094641/https://www.photonics.com/Articles/324-GHz_Waves_Reported/a29289> (Year: 2007).*

(Continued)

*Primary Examiner* — Matthew M Barker

(57) ABSTRACT

An apparatus comprises a coherent radar system on a single chip configured to transmit high-frequency signals with a center frequency in a submillimeter wavelength range that corresponds to a frequency range of 0.3 THz and no greater than 0.4 THz. The radar system on the single chip (RSOC) comprises a phased array transmitter antenna configured to emit a radar beam with a center frequency of greater than 0.3 THz and no greater than 0.4 THz. The RSOC further includes a receiver configured to provide a voltage signal to a wide band receiver voltage controlled oscillator to form a phased array receiver antenna configured to receive reflected signals from the emitted radar beam.

13 Claims, 6 Drawing Sheets

Related U.S. Application Data

(60) Provisional application No. 63/161,323, filed on Mar. 15, 2021, provisional application No. 63/143,880, filed on Jan. 31, 2021, provisional application No. 63/134,373, filed on Jan. 6, 2021, provisional application No. 63/126,312, filed on Dec. 16, 2020, provisional application No. 63/043,779, filed on Jun. 25, 2020.

(51) Int. Cl.
   *G01S 7/41* (2006.01)
   *G01S 13/42* (2006.01)
   *G01S 13/89* (2006.01)
   *G01S 13/02* (2006.01)

(52) U.S. Cl.
   CPC ....... *G01S 13/89* (2013.01); *G01S 2013/0245* (2013.01)

(56) References Cited

U.S. PATENT DOCUMENTS

| | | | |
|---|---|---|---|
| 11,550,028 | B2 | 1/2023 | Melzer et al. |
| 2003/0162521 | A1 | 8/2003 | Vorenkamp |
| 2008/0129581 | A1 | 6/2008 | Douglass |
| 2008/0278370 | A1* | 11/2008 | Lachner .................. G01S 13/87 342/200 |
| 2009/0184889 | A1 | 7/2009 | Kier |
| 2010/0090886 | A1 | 4/2010 | Beasley |
| 2011/0181300 | A1 | 7/2011 | Bowring |
| 2011/0304498 | A1 | 12/2011 | Yanagihara et al. |
| 2012/0075477 | A1 | 3/2012 | Daly |
| 2012/0081544 | A1 | 4/2012 | Wee |
| 2012/0293355 | A1 | 11/2012 | Marianer et al. |
| 2013/0207830 | A1 | 8/2013 | Watts et al. |
| 2014/0144009 | A1 | 5/2014 | Chattopadhyay |
| 2015/0185314 | A1* | 7/2015 | Corcos .................. G01S 13/02 342/200 |
| 2015/0285907 | A1 | 10/2015 | Mohamadi |
| 2016/0116581 | A1 | 4/2016 | Mohamadi |
| 2016/0139258 | A1 | 5/2016 | Vellas |
| 2017/0031004 | A1 | 2/2017 | Jales |
| 2017/0212059 | A1 | 7/2017 | Charvat et al. |
| 2018/0217249 | A1 | 8/2018 | La Salla et al. |
| 2020/0311899 | A1 | 10/2020 | Piette |
| 2020/0326416 | A1 | 10/2020 | Albasha et al. |
| 2020/0341493 | A1 | 10/2020 | Sabato |
| 2021/0405182 | A1 | 12/2021 | Reynolds |

FOREIGN PATENT DOCUMENTS

| | | |
|---|---|---|
| WO | WO 2009131806 A1 | 10/2009 |
| WO | WO2018169517 A1 | 9/2018 |

OTHER PUBLICATIONS

S. Nowok et al. "3D imaging system based on a MIMO approach at 360GHz for security screening," 2016 Progress in Electromagnetic Research Symposium (PIERS), Shanghai, China, 2016, pp. 671-675, doi: 10.1109/PIERS.2016.7734419. (Year: 2016).*

Sengupta et al. "Terahertz to bits and bits to terahertz: universally programmable chip-scale terahertz systems" (NanoCom '20). Association for Computing Machinery, New York, NY, USA, Article 23, 1-8. https://doi.org/10.1145/3411295.3411319 (Year: 2020).*

Mehdi et al., "Radiometer-on-a-chip: a path toward super-compact submillimeter-wave imaging arrays," Proc. SPIE 7671, Terahertz Physics, Devices, and Systems IV: Advanced Applications in Industry and Defense, 767105 (Apr. 26, 2010); https://doi.org/10.1117/12.850229 (Year: 2010).*

U. R. Pfeiffer et al. , "Current Status of Terahertz Integrated Circuits—From Components to Systems," 2018 IEEE BiCMOS and Compound Semiconductor Integrated Circuits and Technology Symposium (BCICTS), San Diego, CA, USA, 2018, pp. 1-7, doi: 10.1109/BCICTS.2018.8551068. (Year: 2018).*

R. Karim, A. Iftikhar, B. Ijaz and I. Ben Mabrouk, "The Potentials, Challenges, and Future Directions of On-Chip-Antennas for Emerging Wireless Applications—A Comprehensive Survey," in IEEE Access, vol. 7, pp. 173897-173934, 2019, doi: 10.1109/ACCESS.2019.2957073. (Year: 2019).*

H. Jalili and O. Momeni, "A 0.34-THz Wideband Wide-Angle 2-D Steering Phased Array in 0.13 μum SiGe BiCMOS," in IEEE Journal of Solid-State Circuits, vol. 54, No. 9, pp. 2449-2461, Sep. 2019, doi: 10.1109/JSSC.2019.2925523. (Year: 2019).*

K. Guo, Y. Zhang and P. Reynaert, "A 0.53-THz Subharmonic Injection-Locked Phased Array With 63 μW Radiated Power in 40-nm CMOS," in IEEE Journal of Solid-State Circuits, vol. 54, No. 2, pp. 380-391, Feb. 2019, doi: 10.1109/JSSC.2018.2877203 (Year: 2019).*

W. Shin, B. -H. Ku, O. Inac, Y. -C. Ou and G. M. Rebeiz, "A 108-114 GHZ 4×4 Wafer-Scale Phased Array Transmitter With High-Efficiency On-Chip Antennas," in IEEE Journal of Solid-State Circuits, vol. 48, No. 9, pp. 2041-2055, Sep. 2013, doi: 10.1109/JSSC.2013.2260097 (Year: 2013).*

"IEEE Standard for Radar Definitions," p. 42 in IEEE Std 686-2017 (Revision of IEEE Std 686-2008) Sep. 13, 2017, doi: 10.1109/IEEESTD.s017.8048479 (Year: 2017).

Heydari Payam: "Invited Integrated millimeter-wave/terahertz sensor systems for near-field IoT," 2016 53nd ACM/EDAC/IEEE Design Automation Conference (DAC), IEEE, Jun. 5, 2016 (Jun. 5, 2016).

* cited by examiner

SYSTEMS AND METHODS FOR HANDHELD SINGLE CHIP SUBMILLIMETER RADARS

CROSS REFERENCE TO RELATED APPLICATIONS

This application claims priority to, and is a continuation in part of, U.S. patent application Ser. No. 17/243,563, filed on Apr. 28, 2021, and entitled "Systems and Methods for Noninvasive Detection of Impermissible Objects," the contents of which are hereby incorporated by reference in their entirety, and which in turn claims priority to the following patent applications: U.S. Provisional Patent Application 63/043,779, filed on Jun. 25, 2020 and entitled "Systems and Methods for Noninvasive Detection of Impermissible Objects," the contents of which are hereby incorporated by reference in their entirety; U.S. Provisional Patent Application No. 63/126,312, filed on Dec. 16, 2020 and entitled "Systems and Methods for Noninvasive Aerial Detection of Impermissible Objects," the contents of which are hereby incorporated by reference in their entirety; U.S. Provisional Patent Application No. 63/134,373, filed on Jan. 6, 2021 and entitled "Systems and Methods for Multi-Unit Collaboration for Noninvasive Detection of Concealed Impermissible Objects," the contents of which are hereby incorporated by reference in their entirety; U.S. Provisional Patent Application No. 63/143,880, filed on Jan. 31, 2021 and entitled "Systems and Methods for Noninvasive Detection of Impermissible Objects," the contents of which are hereby incorporated by reference in their entirety; U.S. Provisional Patent Application No. 63/161,323, filed on Mar. 15, 2021 and entitled "Steerable High-Gain Wide-Angle Lens for Imaging Applications," the contents of which are hereby incorporated by reference in their entirety.

BACKGROUND

In 1968, the Supreme Court issued its landmark decision in the case of Terry v. Ohio, in which the Court held that the U.S. Constitution's prohibition on unreasonable search and seizure of citizens is not violated when a police officer searches a citizen under the circumstances that the police officer has a reasonable suspicion that a citizen is committing, or is about to commit, a crime, and the police officer has a reasonable belief that the citizen may be armed and dangerous. As the Court stated, "[w]hen an officer is justified in believing that the individual whose suspicious behavior he is investigating at close range is armed and presently dangerous to the officer or others, it would appear to be clearly unreasonable to deny the officer the power to take necessary measures to determine whether the person is, in fact, carrying a weapon and to neutralize the threat of physical harm."

The ruling in the Terry case has led to the widespread use of so-called stop-and-frisk practices by police departments throughout the country, also called "Terry Frisks." The legal boundaries of a Terry Frisk, however, are always in question, and have led to claims of racial profiling. In addition, because of the physical nature of a Terry Frisk, a police officer frisking a person must be close enough to actually touch the person, leading to increased danger to the police officer. Thus, in a Terry Frisk, both the public and the police suffer; the subjects of the search tend to become infuriated by the physical contact and the limits to their freedom, and the police officers performing the frisk are put in peril because of their close proximity to a now-infuriated suspect. Furthermore, the Terry Frisk is prone to error, with police officers often missing the existence of weapons.

In addition to the Terry Frisk, which is a non-consensual interaction between the police and a subject, the public is regularly subjected to a variety of consensual stops and searches. A consensual search is a search in which an individual either implicitly or explicitly gives consent for a search to be conducted as a condition for something else, like entry into a sporting venue, or prior to boarding an airplane. Unlike the Terry Frisk, a consensual search is not considered a detention as the individual is free to leave at any time or can refuse to answer questions. Although law enforcement occasionally uses consensual search when permission is granted by a subject who is not yet a suspect, the more common and pervasive use case of consensual searches is to prevent unwanted items such as guns or alcohol from being brought into buildings, schools, sporting or other events, airports, voting facilities, court rooms, and other venues.

For example, when entering a sports arena, attendees are typically asked to consent to a combination of being scanned (e.g., by a metal detector) and being physically pat down as the hired security searches for improper items such as bottles of alcohol or weapons. This process is slow, error prone, cumbersome, and requires expensive manpower and equipment, all of which ultimately lead to a poor customer experience for the attendee.

Many of these venues are temporary (that is, in non-permanent dedicated facilities) requiring security be set up, including bulky or cumbersome equipment such as metal detectors, before the event and removed after the event. These events include festivals, religious events, polling and election events, concerts, and other temporary events. Security for these venues is of the highest priority for the event promoters and venue owners. Violence, riots, fights, or other problems can result in an impact in future ticket sales leading to significant reduction in revenue and potential litigation.

Airports are an area of particular concern. Security at airports can include expensive equipment like millimeter wave scanners and backscatter x-ray scanners. The millimeter wave scanner is a large, fixed device sized and configured to allow a passenger to stand inside, with feet apart and hands over their head, while the device creates a full-body scan that is reviewed by a TSA agent. Backscatter x-ray scanners subject users to potentially mutagenic x rays and can produce revealing full-body images of passengers that are embarrassingly and unnecessarily obtrusive, and need to be reviewed by a TSA agent.

The common factor in all of these devices is that they exhibit one or more of the following traits: they can be expensive, bulky, slow, and often times dangerous in what they may not detect. Thus, a need exists for a handheld, portable, low-cost device that provides for contactless, non-intrusive, and accurate scanning for weapons or other banned objects, and that does not harm the subject.

SUMMARY

Embodiments of the present invention involve breakthrough innovations to revolutionize how both Terry frisks and consensual searches are conducted. Embodiments include imaging systems that are portable, hand-held, and high-resolution methods and devices that are capable of detecting objects hidden under, for example, people's clothing, or within a bag, or elsewhere. Using embodiments of the present invention, a user can safely conduct a weapons search without being in physical contact with the subject being searched.

Embodiments of the present invention use the novel approach to implement previously bulky and expensive devices on a single chip to provide scanning and imaging functions that can detect devices under, for example, clothing, with sufficient clarity and detail to allow for visual determination that an impermissible object such as a weapon (e.g., a gun or a knife) is concealed on a subject. Embodiments of these innovations include components such as a low noise, high bandwidth Voltage Controlled Oscillator (VCO) to attain a center frequency that exceeds 300 GHz, a coherent mixer that improves receive sensitivity by 1000× over existing solutions, and a full on-chip multi-element scanner that eliminates the need for external antennas or element arrays. Furthermore, embodiments include process innovations allowing these chips to include low-cost 55 nm CMOS, 40 nm CMOS, SiGe semiconductors, or other readily available processes.

Embodiments of the invention include a method or methods for concealed-object detection using one or more handheld, portable, battery operated, electromagnetic scanning apparatuses configured to operate at a distance of two to ten feet. In an embodiment, the operator conducting the object search positions the subject to be scanned at a distance of up to approximately six to ten feet from the apparatus and initiates the scan. In an embodiment, the operator conducting the object search positions the subject to be scanned at a distance of from approximately four feet to approximately ten feet from the apparatus and initiates the scan. In an embodiment, the apparatus emits non-visible electromagnetic radiation with a center frequency found in the frequency band greater than 0.3 THz but no greater than 0.4 THz as part of the scanning process. In another embodiment, the apparatus emits non-visible electromagnetic radiation with a center frequency found in the frequency band between 0.4 THz to 1 THz as part of the scanning process. In an embodiment, the apparatus emits non-visible electromagnetic radiation in the 0.1 to 1 THz range. In an embodiment, the apparatus employs a phased array antenna in conjunction with a voltage controlled oscillator (VCO) to steer the emitted beam both vertically and horizontally to transmit electromagnetic radiation and deterministically illuminate the subject of the scan. Reflected electromagnetic radiation is received by an antenna array on the chip and is coherently mixed with the transmitted signal, allowing differential phase and amplitude information to be recovered. In an embodiment, the received signal is converted from time domain to frequency domain creating data that is used to produce an image. In an embodiment, the resultant image is further processed using a pattern matching algorithm (or a combination of algorithms) to identify objects within the field of view of the apparatus. The objects can be compared against a database of known objects and the operator is alerted in the case of a match.

In an embodiment, the apparatus is configured to show only certain objects on a representation of a subject's body, or objects determined to be suspicious, and not to provide any images of the subject's actual body. In an embodiment, the apparatus is configured to provide a visual representation of a suspicious object. In an embodiment, the apparatus is configured to display where on a subject's body the suspicious object can be found. In an embodiment, the apparatus is configured to provide an audible, visible, or mechanical warning that a suspicious object exists, thus allowing allow the searcher to keep their hands free during the scan. In an embodiment, the apparatus is used in a handheld mode. In an embodiment, the apparatus is used in a hands-free mode, and can be attached to the searcher's clothing or hung from the searcher's body, or attached to the searcher's equipment. In an embodiment, the apparatus can be attached to airborne or terrestrial vehicles, such as, but not limited to drones, automobiles, or robotic systems. In an embodiment, the apparatus can be used in conjunction with, or as part of, a body-worn camera. In an embodiment, the apparatus can be configured to be in communication with a network, and can upload both scanned data and metadata related to the scanned data, to a cloud-based or network-based system for further analysis and storage.

In addition to object detection, in embodiments, the apparatus can be configured to provide an image of a scanned subject's facial features even where the subject is wearing a mask or other clothing or covering. The resultant images can be subsequently used to determine the subject's identity either visually or through the use of a facial recognition system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers.

Figure 1:
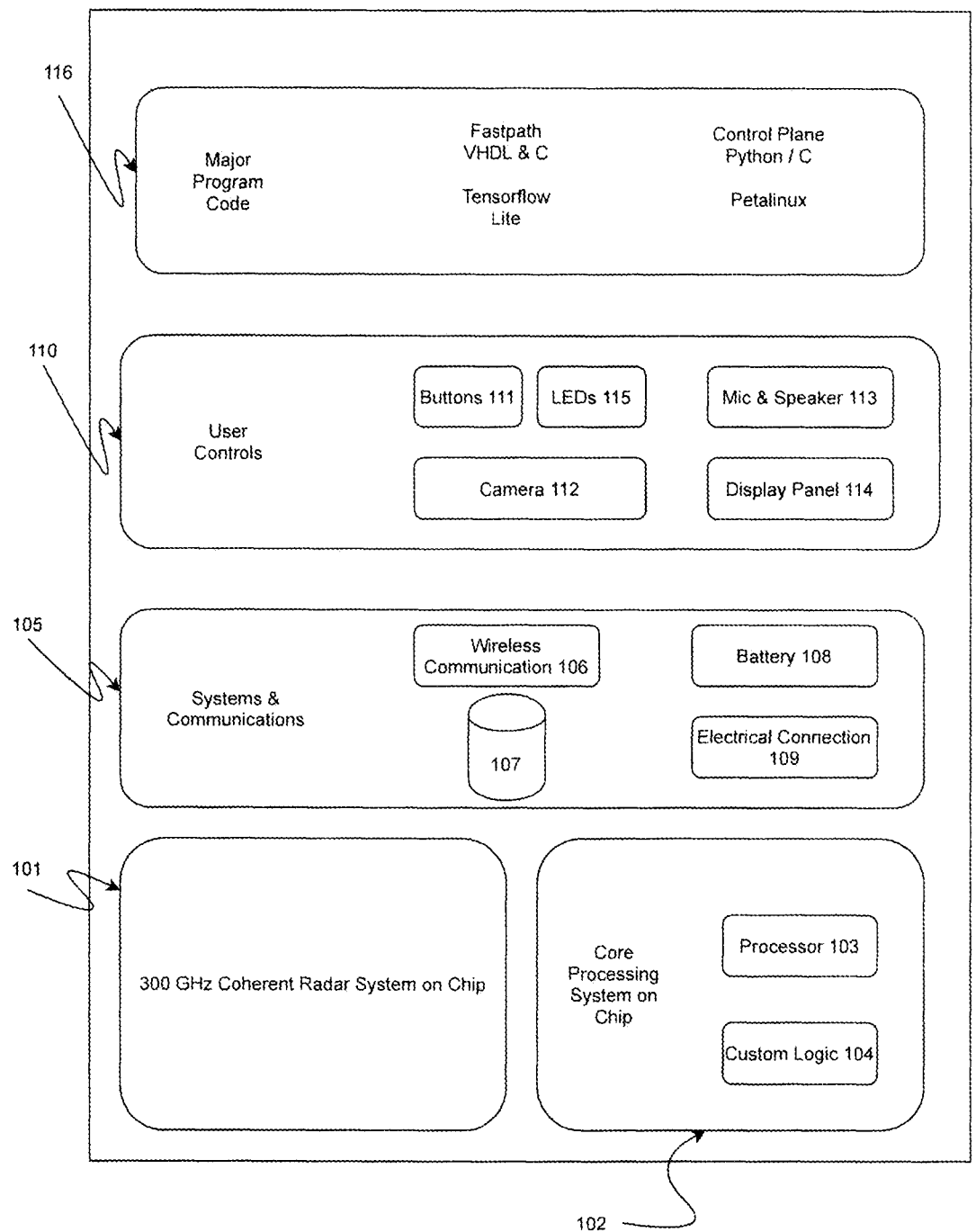
FIG. 1 is a block diagram of a system for providing a noninvasive imaging and detection system, according to an embodiment of the invention.

FIG. 1 is a block diagram of a system for providing a system for noninvasive imaging and detection. In an embodiment, the system comprises a coherent radar system on a chip 101, in communication with a core processing system 102. The core processing system 102 includes a processor 103 and custom logic 104.

The coherent radar system on a chip is configured to provide both range resolution and lateral resolution that is orders of magnitude greater than is found in the prior art. For a single radar chirp emitted by the chip, range resolution, which refers to the quantifiable distance to an object, is directly related to the bandwidth ($f_{max}-f_{min}$), where the available bandwidth is within approximately 5%-15% of the transmitted center frequency. Thus, the higher the center frequency, the higher the available bandwidth, and so the higher the ranging resolution. Because the chip is designed to operate in a THz range greater than 0.3 THz (i.e., the sub-millimeter range), the ranging resolution may be used to distinguish distances in the sub-millimeter range.

Lateral resolution, on the other hand, relates to the quantifiable distance between samples of perpendicular cross section (e.g., side to side and top to bottom). In other words, lateral resolution relates to feature resolution of a scan. As the transmitted signal is swept across the target (i.e., the target is scanned), the resultant received signal is processed to show variations in reflectivity from the scanned target. These variations can be processed by using standard techniques such as, but not limited to, a Fast Fourier Transform (FFT) to produce an image. The feature size, or resolution of the image, is related to the wavelength of the emitted source where the shorter wavelength provides increased resolution. Another way to describe this is to say lateral resolution is a function of both beamwidth and steering, where beamwidth is a function of wavelength divided by antenna dimension. As the frequency of the beam increases, its wavelength decreases, and hence, the beamwidth decreases. In addition, the more antenna elements found on the chip, the larger the dimension, and thus the tighter the beamwidth. The tighter the beamwidth, the higher the resolution of distinguishing cross-sectional differences. Thus, in the submillimeter range where the chip operates, the device can provide sub millimeter lateral resolution. Coherence is used to achieve high receiver sensitivity, and allows for recovery of the difference of frequency between transmitted and received signals. This high receiver sensitivity is used to obviate the need for transmitting a signal on the order of >1,000× or 30 dB higher in power, which would not allow for a single chip implementation of the radar. Thus, in an embodiment, the transmit power used is in the range of greater than 0.1 milliwatt to about 10 milliwatts, which allows for usage in smaller handheld devices.

In an embodiment, core processing system 102 includes processor 103 and custom logic 104. Processor 103 is configured to process instructions to render or display images, initiate a scan, process the results of a scan, alert the user, and provide the results of an object match, if any, to the user. Processor 103 can be any of a variety and combination of processors, and can be distributed among various types and pieces of hardware found on the apparatus, or can include hardware distributed across a network. Processor 103 can be an ARM (or other RISC-based) processor. Additionally, such processors can be implemented, for example, as hardware modules such as embedded microprocessors, Application Specific Integrated Circuits ("ASICs"), and Programmable Logic Devices, including flash memory ("PLDs). Some such processors can have multiple instruction executing units or cores. Such processors can also be implemented as one or more software modules in programming languages as Java, C++, C, assembly, a hardware description language, or any other suitable programming language. A processor according to some embodiments includes media and program code (which also can be referred to as code) specially designed and constructed for the specific purpose or purposes. Custom logic 104 can include one or more Field Programmable Gate Array(s) (FPGA) or any type of PLD for custom logic to support processing offload from Processor 103. In an embodiment, the term "processing offload" includes digital signal processing and digital beam forming.

In communication with coherent radar system 101 and core processing system 102, are the systems and communications circuits 105, comprising wireless communications circuits 106, memory 107, power source 108, and an external electrical connection 109. In an embodiment, the components may be housed within a single housing; in an embodiment, the components, including the coherent radar system on the chip 101, the memory 107, may be stored in separate housings as a need arises to separate chip 101 from memory 107.

Wireless communications circuits 106 can include backhaul communication circuits and can include any practicable wireless communications circuits including, but not limited to, a wireless fidelity ("Wi-Fi") or wireless local area network ("WLAN") connection, a wireless wide area network ("WWAN") connection, a Bluetooth connection, an LTE/5G connection, and/or a cellular connection. In an embodiment, the communications circuits can be wired communication circuits.

Memory 107 can be used to store, in computer code, artificial intelligence ("AI") instructions, AI algorithms, a catalog of images, device configuration, an allowable, calculated, or predetermined user workflow, conditions for altering, device status, device and scanning configuration, and other metadata resulting from the scanning process. Memory 107 can be a read-only memory ("ROM"); a random-access memory (RAM) such as, for example, a magnetic disk drive, and/or solid-state RAM such as static RAM ("SRAM") or dynamic RAM ("DRAM), and/or FLASH memory or a solid-data disk ("SSD"), or a magnetic, or any known type of memory. In some embodiments, a memory can be a combination of memories. For example, a memory can include a DRAM cache coupled to a magnetic disk drive and an SSD. Memory 107 can also include processor-readable media such as magnetic storage media such as hard disks, floppy disks, and magnetic tape; optical storage media such as Compact Disc/Digital Video Discs ("CD/DVDs), Compact Disc-Read Only Memories ("CD-ROMs), and holographic devices: magneto-optical storage media such as floptical disks; Solid state memory such as SSDs and FLASH memory; and ROM and RAM devices and chips.

Power source 108 can include any type of practicable battery, including but not limited to, Lithium-ion, Nickel Cadmium, Nickel-Metal Hydride, and alkaline. Power source 108 can comprise an external power source coupled to circuitry internal to the device. USB connection 109 can be used to put the apparatus in communication with a network, or can be used to provide an electrical connection to charge or power the apparatus.

In an embodiment, the apparatus further includes User Controls 110. User Controls 110 include user buttons 111 to manipulate the apparatus to turn the device on and off, to set the resolution, configure the device, or select a preconfigured setting, initiate a scan, initiate a connection with the cloud based service via one of the network interface (e.g., Wi-Fi, cellular, Bluetooth, or any other practicable interface) and control the camera functions. LEDs 115 can be used to provide feedback and information to the user about the state of the device, or about the results of a scan. Camera 112 is configured to capture optical images, and a microphone and speaker 113 are configured to facilitate communication, including communication to third parties, or communication with the device through voice or audio commands, and for the device to provide sound to the user such as one or more alarms or notifications. Display panel 114 can be an LCD or other type of display panel configured to display messages to the user, or to provide images representing the results of a scan.

In an embodiment, the apparatus comprises major program-code components 116 used to operate and control the device, which can include the computer instructions executed by the apparatus in performing a scan, and other functions of the apparatus. Program-code components 116 can include, but are not limited to, micro-code or micro-instructions, machine instructions (such as produced by a compiler), and files containing higher-level instructions that are executed by a computer using an interpreter. Program code can include hardware, software, firmware, and any practical way of coding. For example, an embodiment may be implemented using HTML, Java, C++, or other object-oriented programming language and development tools. Additional examples of program code include, but are not limited to, control signals, encrypted code, and compressed code. Major program code can include, but is not limited to, a standard operating system (e.g., Linux), hardware drivers for software-managed hardware elements, machine-learning inferencing, image processing, image storage and retention, cloud-service interface, scanning process, user interface, device management, cryptographic functions, user access management, and device health.

Figure 5:
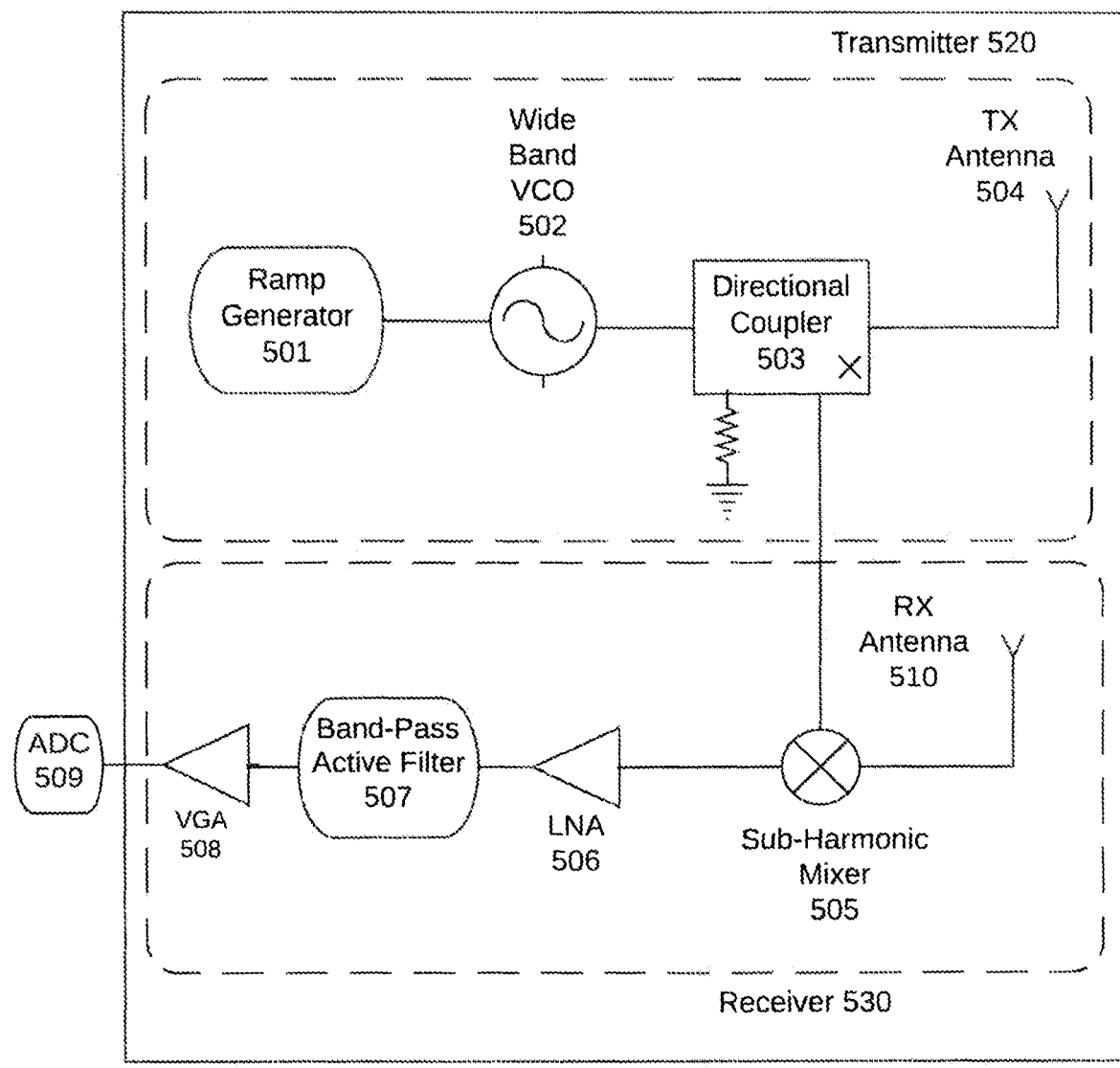
FIG. 5 is a block diagram of a schematic for a radar system on a chip (RSOC), according to an embodiment of the invention.

FIG. 5 is a block diagram for a schematic of a radar system on a chip (RSOC) used in an apparatus, according to an embodiment of the present invention. Notwithstanding anything else in the application, the RSOC includes all the elements described with regard to FIG. 5 on a single chip (with the exception of ADC 509, addressed below). Generally, the RSOC transmits the high frequency signals via TX antenna 504, and receives the reflected signal via RX antenna 510, to produce a baseband analog signal that is digitized by an external analog-to-digital converter (ADC 509) and processed by digital processing logic and a CPU to product a visible image of the scanned target. The RSOC consists of two major functions; 1) A transmitter that produces the radar signal and initiates the scan and 2) a receiver that receives the reflected signal and recovers differential phase and frequency information, and provides that information to the digital processing system.

In an embodiment, Transmitter 520 includes 4 major functional components: Ramp Generator 501, Wide-Band Voltage Controlled Oscillator (VCO) 502, Directional coupler 503, and a Phased-array element array 504. Ramp generator 501 is configured to provide a voltage signal to Wide Band VCO 502, which controls the center frequency of the VCO nominally centered between greater than 0.3 THz to no greater than 0.4 THz. Ramp Generator 501 is configured to move the center frequency of Wide Band VCO 502 over a predetermined frequency that creates a frequency sweeping action to produce the radar scan. Ramp Generator 501 can generally produce a sawtooth voltage waveform, however, other waveforms such as ramp, sinusoid, flat, or combinations thereof, may be employed as well. In an embodiment, the Wide Band VCO 502 is implemented to produce low phase noise, thus improving the receiver's receiver sensitivity. The signal from Wide Band VCO 502 can then be provided to Directional Coupler 503, which can create at least two coherently related identical versions of the input signal. One of the two versions of the input signal is provided to the sub-harmonic mixer as a coherent reference, and the other version of the input signal is provided to the phased array element antenna. Each element in the system acts as an antenna and employs a phase-locked oscillator coherently related to the signal from Wide Band VCO 502 to ensure a fixed phase relationship from adjacent transmitting elements, which can be used for, for example, to attenuate unwanted sidelobes. The high frequency energy produced by the elements is focused using an external radar lens (not shown), generally implemented as a hemispherical component of radar transmissive material, to scan the target and create the reflected high frequency energy to be received by Receiver 530.

In an embodiment, Receiver 530 consists of 5 major functional elements: 1) Receive Antenna (RX Antenna) 510; 2) Sub Harmonic Mixer 505; 3) Low Noise Amplifier (LNA) 506; 4) Band Pass Active Filter 507; and 5) Variable Gain Amplifier (VGA) 508. Receive Antenna 510 is configured to receive the reflected signal broadcast by the transmitter and reflected from the target. RX Antenna 510 may be implemented as a dipole antenna, or by any other practicable antenna configuration. The signal received at RX antenna 510 is provided to the sub-harmonic mixer, which can then create sum and difference frequencies based on the reference signal provided by the transmitter. The sum and difference frequencies are coherently related, and enable the receiver to recover differential phase and frequency, thus improving the noise figure of the receiver by up to approximately 10,000× (or 40 dB) as compared to traditional non-coherent receivers. LNA 506 is used to amplify the signal as required by Band Pass Active Filter 507. Band Pass Active Filter 507 filters off undesirable harmonics created by the Sub-Harmonic Mixer 505. The term 'active' refers to the use of active elements to include linearly biased transistors in conjunction with reactive and passive elements to provide the bandpass filter with minimized or reduced noise and phase distortions of the passed signal. VGA 508 receives the signal from band-pass filter and amplifies and provides the necessary impedance matching for external ADC 509. In an embodiment, ADC 509 is implemented functionally on the RSOC. In an embodiment, ADC 509 is implemented external to the RSOC.

Figure 6:
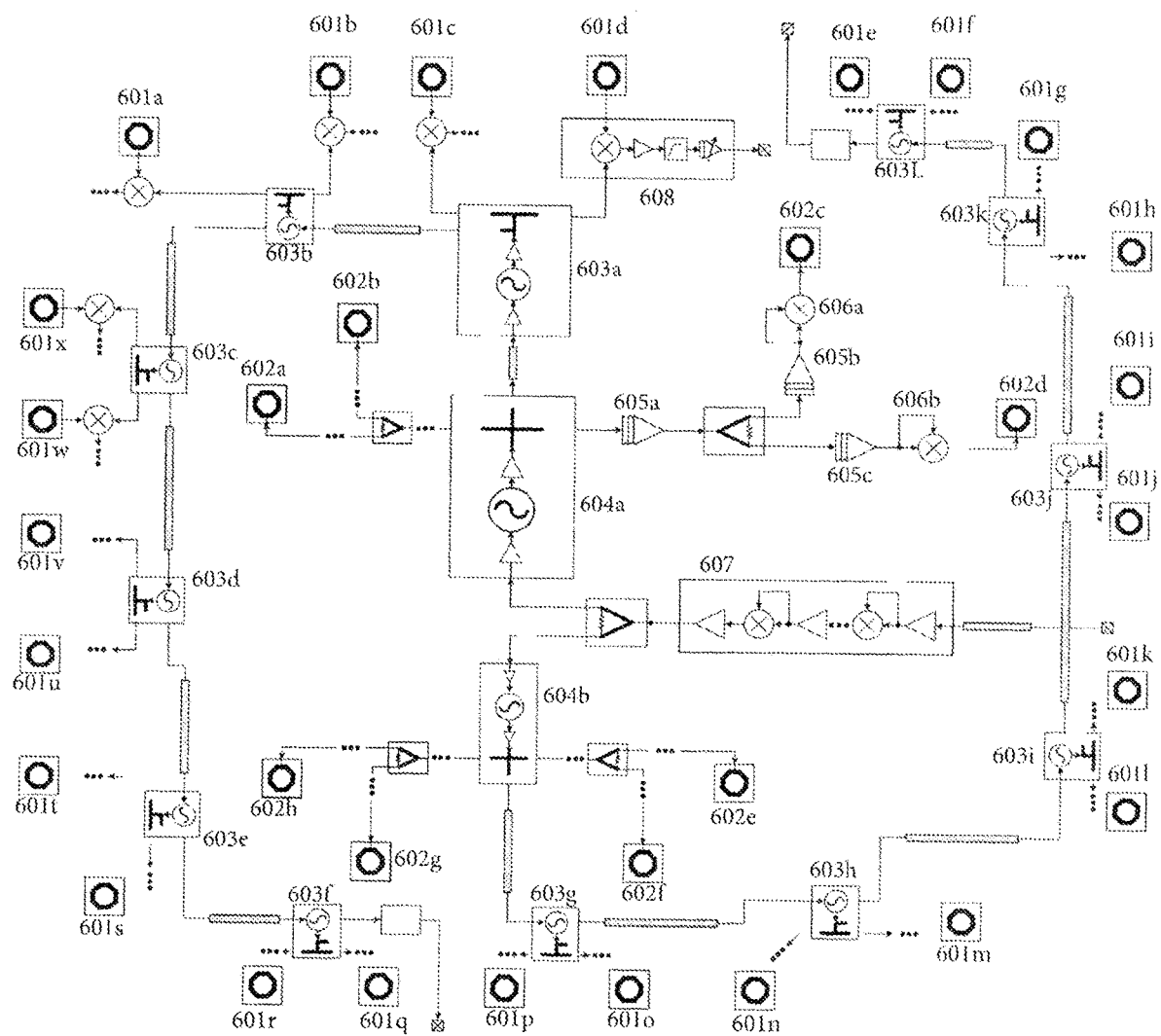
FIG. 6 is a schematic diagram of a coherent submillimeter radar system on a chip, according to an embodiment.

FIG. 6 is a schematic diagram of a coherent submillimeter radar system on a chip, according to an embodiment. The chip includes a first plurality of RX antenna elements and a second plurality of TX antennal elements configured to form RX and TX phased array antennas, respectively, with sufficient power and resolution to determine the nature of an object concealed on a subject while remaining on a single chip. In the embodiment in FIG. 6, the chip includes an array of 24 receiver antenna elements 601a-601x, and 8 transmitter antenna elements 602a-602h on a chip using 40 nm CMOS processes (giving 192 RX/TX pair combinations).

Each receiver antenna element is spaced no closer to any other receiver antenna element than a distance roughly equal to ½ the wavelength of the received signal; each transmitter antenna element is spaced no closer to any other transmitter antenna element than a distance roughly equal to ½ the wavelength of the transmitted signal. This, in an embodiment, allows an entire phased array of 32 elements (24 receives and 8 transmitters) to be implemented, complete with all other functions within a single silicon die with a size smaller than 40 mm$^2$, to create a coherent imaging radar system on a chip (RSOC) necessary for precise ranging and shape detection in a handheld embodiment. As discussed above, known imaging radars that use phased arrays for imaging determination transmit and receive at microwave or millimeter wave frequencies, far below the frequencies used by the embodiments of the present invention, and with antenna array structures exceeding any single-chip possibility due to the corresponding long wavelengths at those frequencies.

One skilled in the art will appreciate that the antenna spacing is essential for configuring a phase array capable of forming and steering a beam, according to an embodiment, while mitigating side lobe interference and maximizing resolution of the scanned objects.

As can be seen in FIG. 6, in addition to the transmitter and receiver antenna elements included in their respective phased arrays, in an embodiment, the single chip includes additional components to (i) manage the receiver elements as a phased array receiver antenna, (ii) manage the transmitter elements as a phased array transmitter antenna; and (iii) provide frequencies greater than 0.3 THz. At 603a-603L, and 604a-604b. To do this, the chip includes receiver voltage controlled oscillators (RX VCOs) electrically coupled to each receiver antenna element, and transmitter voltage controlled oscillators (TX VCOs) electrically coupled to each transmitter antenna element. The TX VCOs (604a-604b) are used to generate and sweep the transmitted radar signal, which can then be reflected by a target. The frequency of the TX VCOs is modulated using a chirp signal. In an embodiment, the RX VCOs generate signals at a proportional frequency that are then used to mix with the received (reflected) radar signal to generate an intermediate frequency (IF) signal that is half the frequency of the transmitted signal.

Amplifiers 605a-605c are tuned to amplify the signal used to generate the transmitted signal to greater than 0.3 THz. One skilled in the art would understand that the frequency of the transmitted signal referred to above is the center frequency of the transmitted radar signal. This amplification increases the efficiency of frequency doublers 606a and 606b by amplifying the signal and then doubling it to achieve the transmitted THz signal. In an embodiment, the frequency doublers are sufficiently wideband to accommodate the entire TX signal bandwidth. In an embodiment, the entire TX signal bandwidth can be from 0.304 THz to 0.312 THz.

In an embodiment, the RSOC is an FMCW radar that uses a linear waveform to modulate the frequency of the transmitter signal using a chirp signal to sweep the frequencies through the frequency range to improve resolution. This function is performed by multiplier chain 607, which receives the chirp signal for processing. In an embodiment, the chirp signal is generated off chip, on a printed circuit board, to improve frequency stability and to reduce phase noise. The received signal is multiplied through the multiplier chain, and is then injected into the TX VCOs 604a and 604b to lock its frequency and to ensure that the TX signals from all eight transmitters are in sync with each other. As a function of the circuitry being on the single chip, the received signals are mixed with combinations of the transmitted signals, creating a coherent system substantially improving signal to noise ratio.

In an embodiment, RX Pixel 608 is used as follows: when the signal is received from a receiver antenna 601, it passes through a mixer (that uses an RX VCO 603). The intermediate frequency signal is then amplified by a low-noise amplifier and then a high-pass filter to reject the image frequency. The signal then goes through a variable gain amplifier to ensure the amplitude of the received signal is within the applicable range regardless of the signal level at the antenna. This receiver chain is referred to as RX pixel. From there, in an embodiment, the signal is sent off to a host board for further processing.

Figure 2:
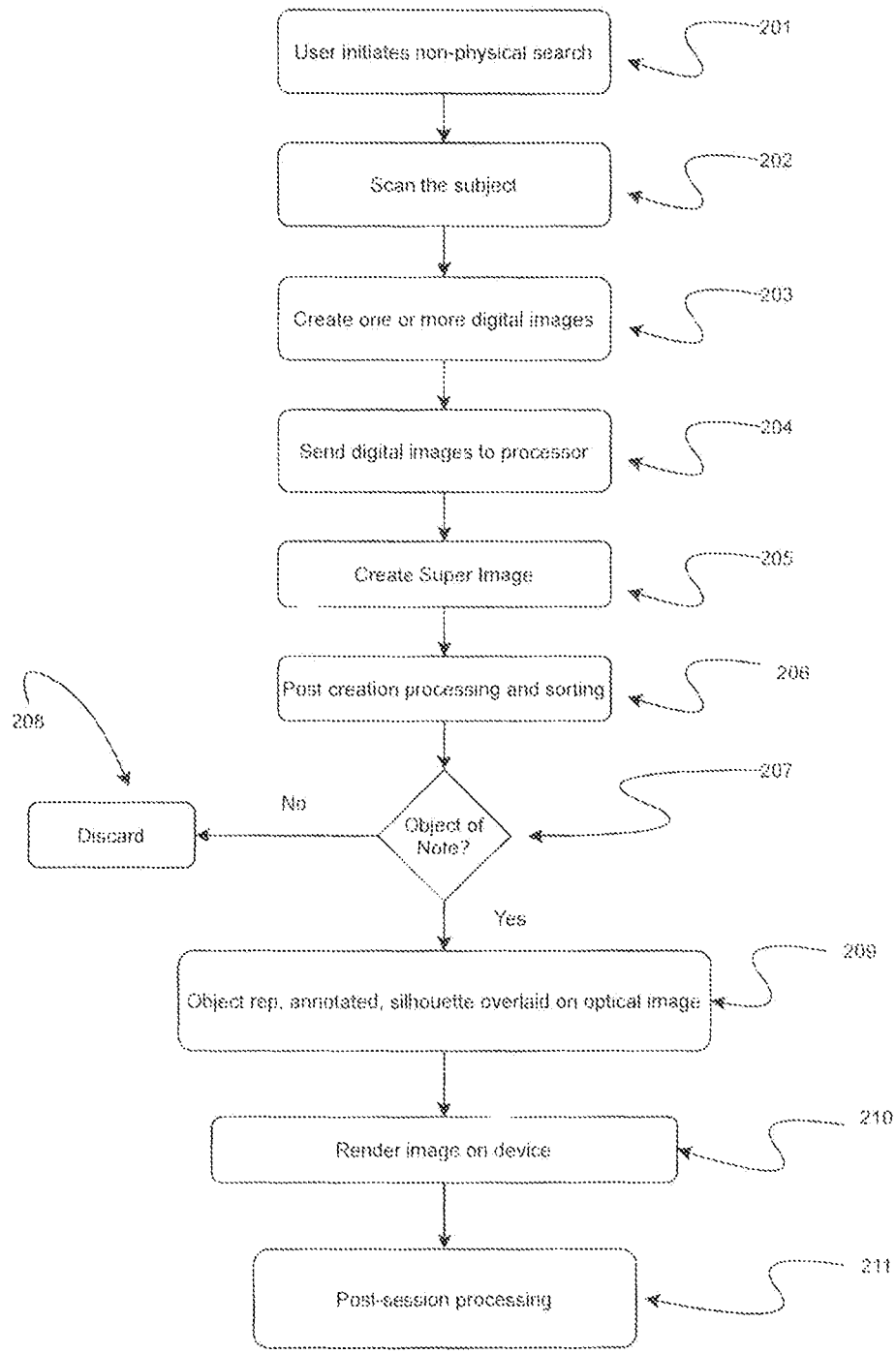
FIG. 2 is a flow chart of a process for noninvasive concealed-object detection, according to an embodiment of the invention.

FIG. 2 is a flow chart of a method for using a non-invasive scanner for creating images useful for imaging and detection. Prior to use, in an embodiment, the apparatus will have, and will be in, one of a set of operational modes and or states, including a low-power or standby mode, a synching mode, and an off mode. A user can generally tell, based on the apparatus's display, whether the apparatus is in an operational mode or not. In an embodiment, the apparatus will be able to show the local user which state the apparatus is in, via LEDs, local LCD panel, or using an audible warning. If the apparatus is in an off mode, then the apparatus is powered off and does not perform any scanning. In an embodiment, the apparatus can be in a state that requires user interaction to set up the apparatus in sync mode and connect it to an online network for backup and additional functionality such as uploading data and metadata. In an embodiment, the apparatus can be set to sync automatically through the online network.

In sync mode, the apparatus can send and receive operational control parameters such as a cryptographic device key for device or user login to the system, user-configuration data detailing, for example, who is using the apparatus, what organization or department the user belongs to, updates to the machine-language inferencing engine, relevant (e.g., user or departmental) policies and controls, including general policies on alert, event, and trigger actions. In addition, the operational control parameters can include information detailing how full the device disk is, and whether upload is required. In an embodiment, the machine-language inferencing engine is the process that performs the object pattern matching and subsequent identification. In an embodiment, it can be implemented in software and accelerated using and FPGA. In an embodiment, it can be implemented in hardware. In an embodiment, it can be implemented in any practicable combination of hardware and software.

In the low power or standby mode, in an embodiment, the apparatus is operational and ready for use. In an embodiment, network access exists, along with a live connection to any related network services. In another embodiment, no network access exists. The apparatus can include sufficient local storage and processing power for operating independent of a network. The apparatus can further include a timer along with a device key to allow a user to use the apparatus as long as the timer has not timed out, thus ending the user session on the apparatus.

In embodiments, other modes that can be used by the apparatus include active-target-acquisition mode, and active-non-physical-search-in-process mode. In active-target-acquisition mode, the apparatus will show or relate the field of view to the user with an active camera and prepare to go to state 5. State 5 defines the system being in the active state of a non-physical search. In this state, the apparatus imaging system pipeline and real-time alerts and notifications are active.

In an embodiment, if the device is ready for use, then at 201, the user initiates a non-physical search of a subject. In an embodiment, the initiation of the non-physical search can begin with a user setting up a subject between 5 and 10 feet away from the apparatus. The subject can then be asked to look at the user and/or the apparatus. The user can then point the apparatus toward the subject and turn on the scanning function of the device via a button, trigger, voice control, or other control switch.

At 202, in an embodiment, the apparatus scans the subject. To do this, in an embodiment, the radar system on a chip generates a radar signal and sweeps a predetermined field of view, emitting a sub millimeter radar signal with a center frequency in the range greater than 0.3 THz to no greater than 0.4 THz. The apparatus employs a phased array antenna in conjunction with a voltage controlled oscillator (VCO) to steer the emitted beam to transmit electromagnetic radiation and deterministically illuminate the subject of the scan, according to an embodiment. To complete the scan, the emitted signal interacts with the subject, and a certain amount of the electromagnetic radiation is reflected back and received by an antenna on the apparatus. The received signal is coherently mixed with the transmitted signal allowing differential phase and amplitude information to be recovered. In an embodiment, the transmit signal is combined, or mixed, with the returning signal allowing for recovery of frequency and phase information in the receive signal. For the purposes of the present invention, the terms "sub millimeter," "submillimeter," and "sub-millimeter" can be used interchangeably.

At 203, in an embodiment, the analog signal from the scan is converted to a digital format using one or more analog-to-digital converters (ADCs) to create a digital image that can be forwarded to the processing complex of the apparatus. In an embodiment, the process of scanning and creating an image can be repeated a predetermined number of times (programmed into the apparatus or selected by the user) creating multiple digital images.

At 204, in an embodiment, the multiple images are sent to the processor, and at 205, the multiple images are combined in the processor to form a super image to enhance resolution, creating a super image. The steps of this super imaging process are detailed in FIG. 3, discussed below. At 205, the feature resolution of the image is enhanced, thus improving the chances for object recognition in 206.

Once the post creation processing and sorting has been performed at 206, a determination is made at 207 as to whether an object of note is found. If an object of note is not found, at 208 the image and its corresponding data can be discarded. If an object of note is found, then at 209, the object of note is superimposed as an outline over an outline of the scanned target, and at 210, the final image is presented to the user. The image can be rendered on a screen on the device. Optionally, the image can be rendered on a smartphone or other mobile device. When rendered or displayed, the image can contain the original visual image of the target with representations of objects found. The multiple images can also be combined to create a video stream. And because the scanning process provides ranging information, the device can provide a three-dimensional rendering of the image. In an embodiment, different colors are used to indicate the threat level of the detected object. As an example (but not the only example), a red outline displayed on the apparatus can indicate the presence and position of a gun. As another example (but not the only example), a green outline can be used to indicate the presence of keys, or some other equally innocuous object.

In an embodiment, an image of an identified object, or a representation thereof, can be superimposed over a representation of the scanned target. In an embodiment, the representation can be an outline of the scanned target, e.g., a generic outline of a human form, over which the image representing the identified object can be placed to provide the user with information about the positioning of the object on the subject's body, in addition to detailing the threat level of the object. In an embodiment, the representation of the scanned target can take the form of a variety of zones displayed on a screen positioned on the apparatus, or on a mobile device in communication with the apparatus.

Upon completion of a search, at 211, post-session processing takes place. This processing can include all or some of the following: tagging images or videos with metadata, gathering and uploading metadata, generating a report, providing a digital signature or certificate, archiving, and uploading the data (both received and processed) and metadata. In this step, images can be cryptographically tagged with various metadata and transmitted and stored on the device, or can be uploaded for further processing. If a data repository is used (e.g., a cloud-based database or an online server), the images, videos, and metadata can be stored there. Examples of metadata can include (but are not limited to) time stamps, geolocation data, device data, customer specific information (user, associated visual images), networked or connected devices, voice recordings, and session information. In an embodiment, a web-based service can be implemented using public cloud infrastructure and services such as those provided by (but not limited to) AWS, Azure, and GCP.

Figure 3:
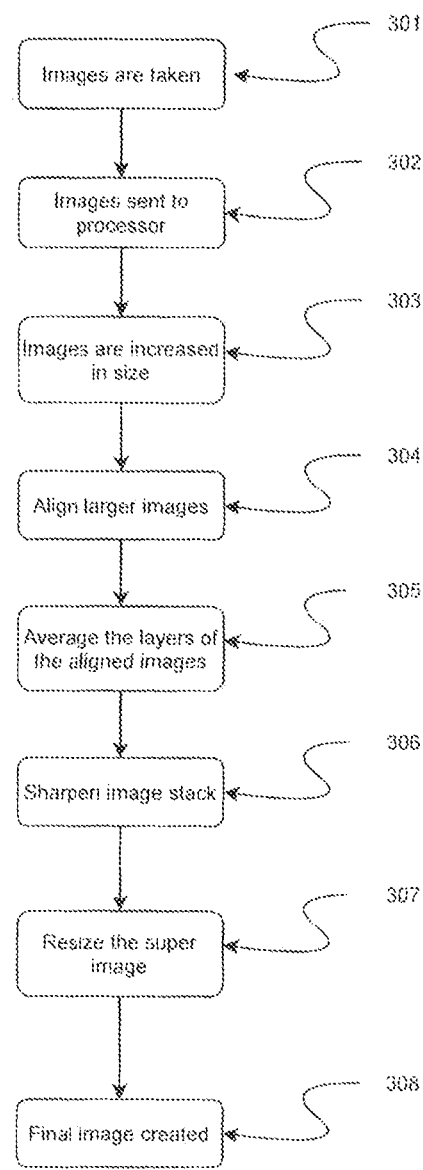
FIG. 3 is a flowchart of a method for creating a dataset from images taken by a non-invasive scanner, the dataset being appropriate for post processing and use in imaging and detection, according to an embodiment of the invention.

FIG. 3 is a flowchart of a method for creating a dataset of images to be used for imaging and detection, according to an embodiment. At 301, one or more images are taken. At 302, the images are sent to a processor for processing. The image or images received at the processor are increased in size by a predetermined amount creating a set of larger images, at 303. In an embodiment, the images are increased in size to achieve finer blending of the image stack in order to extract the high frequency data that is embedded in the low frequency data hidden in the aliasing.

At 304, at least a subset of images in the set of larger images are aligned, according to an embodiment. In an embodiment, at 305, the layers are averaged with linear opacity 1, 0.5, 0.25, 0.125, and so on, allowing images, in an embodiment, to be blended evenly, making use of the aliasing.

At 306, in an embodiment, the image stack, the plurality of images being combined, is sharpened using a predetermined radius. At 307, according to an embodiment, the final super image is resized. One skilled in the art will understand that the output can be resized to any desirable size using any practicable resampling method that provides an appropriate image. At 308, the super image is used to create the final image (seen in 206 from FIG. 2). Once the super image is created, the image is further processed, as detailed in FIG. 4, discussed below.

Figure 4:
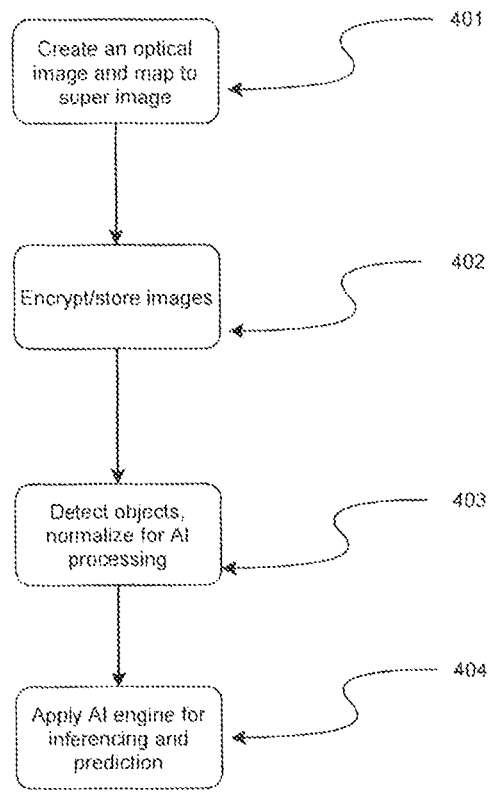
FIG. 4 is a flowchart of a method for processing a final image, according to an embodiment of the invention.

FIG. 4 is a flow chart of a method for processing the existing data to create a final image. At 401, an optical image is created and mapped to the super image creating a filtered image. In an embodiment, the apparatus uses a separate camera to create an optical image used as a base image configured to be mapped to the super image, according to an embodiment. In an embodiment, the separate camera is a digital camera using a CCD sensor, or a CMOS sensor, or any practicable sensor.

At 402, in an embodiment, the filtered images are encrypted, while the unfiltered image data is discarded. One skilled in the art will understand that the encryption can be performed using SSL or TLS secure encryption, or any practicable encryption. In an embodiment, the apparatus stores some or all of the filtered image locally. In an embodiment, the apparatus stores some or all of the filtered image in a backend cloud service where it can be archived or undergo additional processing, or both.

At 403, in an embodiment, the super image is analyzed to determine whether any objects of note are present on the subject, and if so, the super image is normalized for processing. In an embodiment, normalizing the super image means preprocessing it into a format, or with information, appropriate to feed an artificial intelligence system. This preprocessing can include (but is not limited to) scaling to a fixed width and height, conversion of the bit depth, shifting and or rotation of image. The processing can be performed by an artificial intelligence (AI) system.

At 404, once the objects have been normalized, the resultant image is transferred to an AI engine for pattern matching against known threats and then calculating the likelihood that the input data is a threat. As part of the image processing, in an embodiment, the apparatus performs an image search to match detected shapes against a prebuilt local image threat library, or a mathematical model representing such images, and makes a threat determination using parameters such as shape type, size, type of weapon, confidence level, contrast, and other parameters. Entries in the threat library can include some or all of the following: guns, knives, bombs and bomb vests, clubs, truncheons, bottles, and other objects of interest. In an embodiment, once a preliminary determination has been made that a weapon is suspected, the apparatus will focus in on the suspected weapon(s) and provide better image resolution to improving the detection confidence. In an embodiment, privacy filtering processing is applied, thus ensuring all locally storage body images are obfuscated as part of the image processing described in FIG. 3.

In an embodiment, the policies and control of the apparatus, the chip, and the general system, can be configured and controlled by a hierarchical set of domains allowing for different domains to grant configuration control to subordinate domains. In an embodiment, the policy and configuration control can be separated from the users of the device to ensure compliance, operational procedures, and in general, simplicity of use. In an embodiment, the policy and configuration control can be performed and input by a local user. In an embodiment, the policy and configuration control and be performed and input using an AI system. One skilled in the art will understand that policy and configuration control can take place in various aspects of embodiments of the invention, and can be provided by various means. For example, when analyzing the super image, as discussed above, the analyzing can be performed: (i) using policies input by the user, (ii) using policies that are remotely generated and transmitted to the apparatus, (iii) using policies that are generated automatically by the processor located on the device, or using policies that are configured and controlled by a hierarchical set of domains for allowing for different domains to grant configuration control to subordinate domains, or any combination of the above.

In an embodiment, the device can allow users to configure policies and alerts for different actions, and to provide feedback in different forms. In an embodiment, alerts can be visual (e.g., providing an outline of an object on a screen). In an embodiment, alerts can be audible (e.g., emitted by a device speaker or through an ear-piece). In an embodiment, alerts can trigger or prompt a user for additional actions of a remote device (e.g., via call to API), or other user defined actions.

In general, an event that triggers a display or alert of an unwanted object (as examples) can combined with, and work with, other events using, for example, Boolean logic to form complex triggers. Examples of triggers can include: More than two unidentified objects were found that were larger than a predetermined size. Events can include but are not limited to: an object is identified via machine learning with a predetermined probability; a person is identified via facial recognition, within a predetermined probability; an object of size greater than a predetermined size is found but not identified; an object of size smaller than a predetermined size is found but not identified; a search took place at a certain time of day, or within a certain range of times; and/or whether a contactless Terry Frisk is required; and any other event that can trigger an action.

Examples of alerts and controls can include: logging an event locally or in the cloud; logging an event in the cloud in either real time or in a batch upload; alerting a user with local audio, vibration, light or local display; alerting a user via a headset, earbuds, glasses, or any other remote device; texting to one or more mobile phone numbers or sending an alert to a mobile app; emailing an alert to one or more email addresses; providing a suggestion to a user on what a next step is for them to take, in addition to the alert itself; communicating to other contactless search devices as a remotely generated event; and calling a custom remote API, which can prompt some other action such as unlocking or locking a door, turning lights on or off, or any other customer-defined action.

One skilled in the art will understand, in the context of embodiments of the invention, that the term "a combination of" includes zero, one, or more, of each item in the list of items to be combined.

For the purposes of the present invention, the term computer program or computer code includes software, firmware, middleware, and any code in any computer language in any configuration, including any set of instructions or data intended for, and ultimately understandable by, a computing device.

One skilled in the art will understand that the order of elements described in each figure is given by way of example only and where appropriate, can be changed in any practicable way.

In some embodiments, the processes in FIGS. 2-4, or any portion or combination thereof, can be implemented as software modules. In other embodiments, the processes in FIGS. 2-4 or any portion or combination thereof, can be implemented as hardware modules. In yet other embodiments, FIGS. 2-7, or any portion or combination thereof, can be implemented as a combination of hardware modules, software modules, firmware modules, or a form of program code.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps, as appropriate. Additionally, steps may be performed in any suitable order. As used in this document, "each" refers to each member of a set or each member of a subset of a set.

What is claimed is:

1. A method, comprising:
   scanning a subject with a coherent submillimeter radar beam from a single chip radar system operating in a corresponding frequency range of between 0.1 THz and 1 THz the radar system comprising a transmitter that includes:
   a ramp generator electrically coupled to, and configured to provide a voltage signal to, a wide band voltage controlled oscillator;
   a directional coupler electrically coupled to the wide band voltage controlled oscillator, and
   a phased array antenna electrically coupled to the directional coupler and configured to transmit high-frequency signals in the range of operation;
   the method further comprising:
   executing instructions, on a processor, to create a plurality digital images based on said scanning;
   combining, at the processor, the digital images to form a super image;
   determining, at the processor and based on the super image, whether the subject is carrying a concealed object;
   when the subject is determined to be carrying a concealed object, determining, at the processor, whether the object meets certain rules for generating an alert; generating the alert.

2. The method of claim 1, wherein the alert is at least one of an audible alert or a visual alert.

3. The method of claim 2, wherein in the alert includes rendering a representation of the subject and the impermissible object on a screen, the representation of the impermissible object being superimposed on the representation of the subject in a position that visually approximates where on the subject the impermissible object is located.

4. The method of claim 3, further comprising:
   providing post-session processing of data acquired from the subject to create post-session data; and
   feeding the post-session data into an artificial intelligence engine for future use as part of the artificial intelligence engine.

5. The method of claim 4, wherein said determining includes:
   analyzing the super image to determine whether any objects of note are present on the subject;
   if an object of note is determined to be present, normalizing the super image for feeding into an artificial intelligence system;
   transferring the normalized super image to an artificial intelligence system for pattern matching against known impermissible objects; and
   calculating, based on the normalized super image and on artificial intelligence data stored in the artificial intelligence system, the likelihood that the subject is carrying an impermissible object.

6. The method of claim 5, wherein said calculating includes performing an image search to match a detected shape against a prebuilt local image threat library.

7. The method of claim 6, wherein said analyzing is based on policies that are remotely generated and transmitted to the apparatus.

8. The method of claim 1, wherein the coherent radar system on a single chip further comprises a radar lens configured to shape a field of view of the output from the transmitter, as well as the reflected signal from the target back to the input of the receiver.

9. The method of claim 8, wherein the coherent radar system on a single chip further comprises: a mixer electrically coupled to the phased array receiver antenna;
   a band-pass active filter electrically coupled to the mixer via a low-noise amplifier configured to amplify a signal feeding the band pass active filter; and
   a variable gain amplifier configured to receive an electrical signal from the band pass active filter.

10. The method of claim 9, wherein the mixer is configured to create coherently related sum and difference frequencies based on the received signal and a reference signal provided by the transmitter.

11. The method of claim 10, further comprising:
    processing instructions to provide at least one of the following set of functions: an alert to a user indicating a detection of an object, or the result of a match between a detected object and an object stored in a database.

12. The method of claim 11, further comprising:
    processing instructions, at a processor, to perform at least one of the following set of functions: rendering an image, displaying an image, initiating a scan, or processing the results of the scan.

13. The method of claim 12, further comprising:
    receiving, at a processor, user inputs to manage the coherent radar system.

* * * * *